United States Patent
Gauss et al.

[19]

[11] Patent Number: 5,676,505
[45] Date of Patent: Oct. 14, 1997

[54] METHOD AND MILLING TOOL TO MAKE DEEP GROOVES IN A WORKPIECE, ESPECIALLY IN ROTORS OF GENERATORS AND TURBINES

[75] Inventors: Roland Gauss, Ammerbuch; Rolf Vollmer, Tübingen, both of Germany

[73] Assignee: Walter AG, Tübingen, Germany

[21] Appl. No.: 517,595

[22] Filed: Aug. 22, 1995

[30] Foreign Application Priority Data

Sep. 7, 1994 [DE] Germany .................... 44 31 841.3

[51] Int. Cl.[6] .................................................. B23C 5/22
[52] U.S. Cl. ........................ 409/132; 407/51; 407/58
[58] Field of Search ............................. 409/38, 51, 131, 409/132; 407/29, 61, 51, 58, 60, 64, 34; 29/598, 889.2

[56] References Cited

U.S. PATENT DOCUMENTS

| | | | |
|---|---|---|---|
| 1,472,960 | 11/1923 | Conklin | 407/29 |
| 1,614,558 | 1/1927 | Kasley | 409/131 |
| 3,200,474 | 8/1965 | Kralowetz | |
| 3,619,899 | 11/1971 | Takeda et al. | 29/598 |
| 3,701,187 | 10/1972 | Erkfritz | |
| 4,060,880 | 12/1977 | Nowak | 407/61 |
| 5,123,786 | 6/1992 | Yates et al. | 407/29 X |
| 5,430,936 | 7/1995 | Yazdzik et al. | 29/889.2 |

FOREIGN PATENT DOCUMENTS

| | | |
|---|---|---|
| 0 548 036 | 6/1993 | European Pat. Off. . |
| 933 365 | 9/1955 | Germany . |
| 32 10 059 A1 | 9/1983 | Germany . |
| 8604196 U1 | 4/1986 | Germany . |
| 1155374 | 5/1985 | U.S.S.R. ........... 409/131 |

OTHER PUBLICATIONS

Werkstatt Und Betrieb, Bd. 113, No. 5, May, 1980, Munchen de Seiten 317–318, Andreolli "Bearbeitung Von Turbogeneratoren".

Article by S. Neumann, "Methoden und Maschinen zur Fräsbearbeitung von Generator–und Turbinenrotoren" (Methods and Machines for Milling Operations on Generator and Turbine Rotors), published by Köllmann Maschinenbau GmbH, Special Reprint No. 9, pp. 5–12, 1969.

*Primary Examiner*—Daniel W. Howell
*Assistant Examiner*—Henry W. H. Tsai
*Attorney, Agent, or Firm*—Frishauf, Holtz, Goodman, Langer & Chick, P.C.

[57] ABSTRACT

A deep groove, for example a groove in a rotor for a generator or turbine, can be formed in the rotor blank in only two sequential milling cuts, and wherein each milling cut, utilizing a single rotary milling cutter, carries out at the time both coarse cutting of the groove and finish cutting, for surface smoothing, of the coarse cut along the inner surfaces of the groove. The milling cutter carries cutter chips (22, 23, 25; 44, 46) retained against chip seats (27) in cutter chip cartridges (21, 210) wherein at least some of the cutter chips have at least one end cutting edge forming a main or coarse cutting edge (33, 35, 42; 45, 47) exposed from the respective cartridge and the tool body (13, 130) for main or coarse cutting. Some cutter chips located on the cartridges also have at least one fine or finish side cutting edge (36, 49) exposed for cutting. The chips having the at least one main cutting edge cut, each, a portion of the width of the grooves, so that the sequential chips and sequential cartridges coarsely cut the entire width of the groove. The chips having the fine or finish cutting edges in at least one of the sequential cartridges have outwardly directed fine cutting edges (36, 49) located adjacent the main cutting edges (35), so that the combined operation of the cutting edges of the chips in sequential cartridges, with the main or coarse end cutting edges and the fine or finish side cutting edges on the respective chips, will generate a complete coarse and finish cut in the workpiece in one operation. Two such tools can be used with different chip configuration to form stepped grooves of, for example, an overall depth of about 22 cm, with a groove width at the widest point of about 4 cm.

19 Claims, 5 Drawing Sheets

METHOD AND MILLING TOOL TO MAKE DEEP GROOVES IN A WORKPIECE, ESPECIALLY IN ROTORS OF GENERATORS AND TURBINES

FIELD OF THE INVENTION

The present invention relates to a method to make deep grooves in metallic workpieces, and to a tool to make such grooves, in which the deep grooves have high surface quality, and extend over substantial lengths. Typical workpieces are rotors used for electrical generators, or for turbines.

BACKGROUND

Electrical current is frequently generated by synchronous generators, which may have rotors having a diameter of about 2.2 m, and an overall length, including axial stubs for retention in bearings of about 20 m, and even more. A forged steel cylinder, with usually integral stub shafts, is first turned to cylindrical shape. Thereafter, parallel longitudinal grooves are cut throughout the length of the rotor blank. These grooves later receive the field windings; they also may function as ducts for cooling fluids and cooling arrangements to cool the field winding. The rotor grooves, in rotors of the above dimensions, typically have a depth of about 22 cm, with a groove width at the widest point of about 4 cm. The grooves may have parallel flanks from the circumference of the blank down to the bottom; the grooves may, however, also be step-shaped, in which the individual steps, starting from the circumference, have progressively smaller width. Arrangements are also known in which the rotor grooves, at least in part, have, in cross section, an essentially V-shaped profile. The grooves in the rotors are shaped to conform to the requirements and design calculations for electrical performance, and the necessity of uniform removal of resistance loss heat. The sides of the windings fitted in a groove are mechanically sensitive, yet precise seating of the windings in the sides of the groove, without play, and subject to close tolerances must be ensured. Thus, the grooves of the rotors, at least in those sections which are designed to receive the sides of the windings, must be cut with close tolerance and must be made to have a surface quality which is smooth and finely finished.

The rotor grooves are usually milled with rotor milling cutters in the previously cylindrically machined rotor blank. Rotor milling cutters are disk cutters specially designed for the purpose. In actual practice, it has been customary to make a plurality of sequential cuts which, first, shape the rotor grooves in different widths, that is, in steps, in a coarse cut. Thereafter, the grooves are finished by a finish working. The coarse cutting and finish cutting steps are done with separate coarse cutting and finish cutting tools, designed for the respective coarse cut and finish cut, respectively. Typically, the rotor groove is first cut in a first operation to the depth.e of a first step or first stage with a coarse cut disk mill cutter, supplied with indexable, rotatable cutting chips. A different cutting tool, then, makes a second cut. The different cutting tool is, again, a disk mill having indexable cutting bits or chips thereon to form a fine or finish cut, so that the first coarsely formed groove, made in the first stage, is then supplied with a smooth finish surface. Thereafter, the tools are again exchanged and a further tool cuts a second stage, again with an indexable bit, coarse cut disk mill; subsequently, and after exchange of cutting tools, a fourth tool in shape of an indexable chip fine or finish cut milling cutter forms finish side surface in the second stage. If necessary, a third stage can be made in a similar manner. If the third stage is only a cooling fluid duct, fine finishing is often omitted.

Grooves having parallel flanks but no cooling duct can be made with somewhat fewer operating steps; yet, in a first stage, a groove was cut to about half the depth thereof by a coarse cutting mill; thereafter, and in the second cut, a second stage was cut up to the final depth of the groove with a different tool. Finally, a finish or smoothing cut is made in a third step with a separate finish cutting milling tool.

This well known sequence of steps to make rotor grooves requires stocking of a plurality of different milling cutters. This is very expensive. These milling cutters, typically, have a diameter of between about 80 to 110 cm, with a cutting width of between about 25 mm to 50 mm. The working time to make these cuts is substantial, and includes long milling machine down time, due to the frequent change in milling cutters, and the required frequent indexing of the workpiece and the sequential operating steps.

THE INVENTION

It is an object to provide a method which simplifies the manufacture of smooth walled grooves in workpieces, typically grooves in rotors for electrical generators or for turbines, which permits manufacture of perfect, smooth walled grooves in shorter periods of time and with fewer requirements of tools and tool changes.

Briefly, each groove is milled, for example in steps, in only two sequential milling cuts, wherein each milling cut, and utilizing a single milling cutter, carries out, at the same time, coarse cutting of the groove and finish Cutting for surface smoothing of the coarse cut. In other words, each cut is, essentially simultaneously, coarse cut for major metal removal and finish cut for surface smoothness and precision.

The rotor grooves most customarily used have two steps of slightly different widths, with respect to the depth of the grooves. At the bottom of the groove, a narrow duct may be formed used to carry cooling fluid. When such cuts are made, only two different tools are needed. In a first cut, essentially simultaneously, a first stage of the groove is coarse cut and the side walls of the groove are smooth cut or finish cut; in a subsequent second cut, the second stage of the groove, and the cooling duct forming a third stage of the groove, are cut essentially simultaneously and the side walls of the second and third stages of the groove are, again essentially simultaneously, finish cut or surface finished, and properly dimensioned.

It is only necessary to provide two milling cutter tools to make the entire groove. This, in comparison to the prior art, results in a substantially shorter operating time since the number of cuts is reduced to two cuts. This results in saving of time to make the cuts and to reduce down time of tools and machinery since the number of tool changes, and indexing steps, are reduced. Additionally, the milling cutters, in feed direction, always operate against a solid metal surface, so that the comparatively thin teeth which will be formed between adjacent rotor grooves cannot be excited to oscillations or vibrations. Such oscillations or vibrations may lead to inaccuracies in dimensions, excessive tolerances, and poor surface quality. In the known method, the grooves are first coarse cut and, thereafter, are surface cut or fine cut. It has been found that, upon fine cutting of the already freely projecting teeth, vibration and oscillation problems, as well as dimension tolerance problems, result. To prevent such vibrations, oscillations and deviations from desired dimensions, it was necessary to support teeth adjacent the groove being worked on by wedges introduced into the precut grooves—which then, again, had to be removed.

Stepped grooves which, in cross section, have generally V shape, can be made in a similar manner; the exact profile of the groove can be generated by suitable arrangement of the cutting tool.

The new method as well as the cutting tools can be used not only to make grooves in generator or in turbine rotors; the method and tools can be used wherever it is desired to cut deep grooves with high surface quality in metallic workpieces which, for example, may be of substantial length.

In accordance with a feature of the invention, and to carry out the above-described method, the milling tools are formed as disk mills with indexable cutter bits or chips thereon. In contrast to known milling tools of this type, the tool bodies are made with larger and deeper cut chip removal recesses, to be able to accept the cut-off workpiece chips which arise upon working of the workpiece as the milling tool is fed and rotated. This is particularly important for the milling cutter cutting the second and third stage of a stepped groove.

The cutting bits can be located in cartridges, as known in rotary milling cutters, so that this technology is also applicable to the milling cutters in accordance with the present invention. The cartridges have seats for the indexable cutting chips, and are secured in the region of the cut-off chip recesses, in precise position on the tool body.

In accordance with a feature of the invention, the groove width is cut by main cutting edges of cutter bits located on at least two sequential, with respect to the direction of rotation, cartridges having different cutting bit arrangements in the respective cassettes. The cutting bits or chips, in accordance with the present invention, are so arranged that the chips which define the width of the groove in at least one of the cartridges have secondary or auxiliary finish cutting edges which are laterally outwardly directed; these auxiliary cutting edges are immediately adjacent the main cutting edge. Thus, the main cutting edge and the auxiliary or secondary cutting edge, in one operation, cut the groove in a coarse cut and, at the same time, provide for smooth surface and accurately dimensioned cutting on the side. Some of the cutter chips in the cartridges have a combination of at least one complete coarse cutting edge and at least one fine or finish cutting edge.

The width of the cut, and the depth of the steps in the groove, can readily be determined by replacement of the cartridges, as required. The result is a modular system which has the advantage that the number of cutter tools to be retained in stock can be reduced to a minimum.

The cartridges are preferably received in a groove-like recess of the milling tool, for radial interengaging fit, and radial support. The support of the cartridges in radial direction reliably retains the cartridges with respect to tipping; reception of the cartridges in the groove-like recess in the end thereof further supports the cartridges with respect to deflection.

Preferably, the cartridges are guided in axial direction with a groove formed therein, engaging a rib or a tooth formed on the milling tool body, to thereby reliably guide the cartridges on the machine tool and support them in axial direction, while eliminating time-consuming adjustment work. The cartridges and the tools are made for precise fits with respect to each other; thus, additional adjustment and alignment work is not necessary when cartridges are changed, for example to cut grooves of different dimensions.

At the same time, the construction of cartridges in this manner, and the attachment, permits ready removal of cut-off workpiece chips on the cutter tool of substantial size which, as described above, is desirable since the cut-off workpiece chips may be of substantial length. Preferably, and in accordance with a preferred embodiment, the cartridges are secured in the machine tool body with a headed screw which extends essentially tangentially with respect to the center of the rotary cutting tool body. Thus, the cartridge, in contrast to prior wedge clamping arrangements, requires fewer attachment parts and permits easy and rapid exchange of cartridges.

In accordance with a feature of the invention, the cutting geometry and arrangement of the cutter chips in the cartridges is so selected that, in axial direction, the forces will be in essential balance. As a result, the rotary milling cutter will have smooth rotary running operation, resulting in high surface quality of the cut, and high accuracy thereof.

In accordance with a feature of the invention, sequential cassettes are so arranged that, with respect to the width of the groove, one cassette has a centrally located indexable cutter chip, or a group of indexable cutter chips, located essentially in the middle thereof. In another cassette, paired axially, with respect to the cutting tool, symmetrically located indexable chips are positioned at corner regions, so that the complete groove is cut by the cutter chips in two sequential cassettes. It is of advantage when at least the cutter chip which is centrally located or, respectively, the group of cutter chips, is located on the tool to be essentially tangential with respect to the milling cutter body. Such a tangential position permits acceptance of high cutting forces and, thus, a high cutting feed and workpiece material removal rate. This is particularly important for the coarse cutting operation. The indexable cutter chips on the other cassette may, also, be located essentially tangentially with respect to the milling cutter body. The regions of their axially outer narrow sides carry the auxiliary or fine cutting edges, which fine finish and dimension the side walls of the groove.

A tangential arrangement of the cutter chips is of importance particularly to make the first stage of the grooves of the rotor. The auxiliary or lateral cutting edges of the cutter chips at the end are free or open. Preferably, these cutter chips are located in an axial adjustment angle which deviates from 0°, advantageously between about 5° to 10°.

It is of advantage particularly for cutter tools which make a second and, if used, third stage or step of rotor grooves if both end-surface cutter chips are located essentially radially with respect to the tool body, and so fixed thereon. This permits obtaining a comparatively long effective length of the secondary or fine cutting edges. The arrangement is preferably so made that sequential cartridges on the milling tool body have one cartridge with laterally cutting main or coarse cutting edges, and the subsequent, with respect to the direction of rotation, cutter chips in the subsequent cassette have additionally laterally operating cutting edges which form surface finishing and/or dimensioning cuts.

The cutter chips may be formed with a relief angle at the free surface of the secondary cutting edge in a region adjacent the secondary cutting edge. Over a, preferably small, distance, this relief angle may be less than the relief angle remote from a region adjacent the base surface of the respective cutting chip, forming a quieting or 0° degree chamfer or, rather, no chamfer or relief, placed on the free surface of the secondary cutting edge. The result is a quieting effect, and thus improvement in smoothness of operation and consequently improved quality of the surface which is being machined.

Advantageously, the cutter chips which cut in the side walls of the grooves have a rounded region adjacent the end of the auxiliary cutting edge; the cutting edge which defines the side wall will form a cut having high surface quality.

The subclaims appended hereto describe further features of the cutting tool.

DRAWINGS

The drawing illustrates examples forming the subject matter of the invention, wherein.

DETAILED DESCRIPTION

Figure 1:
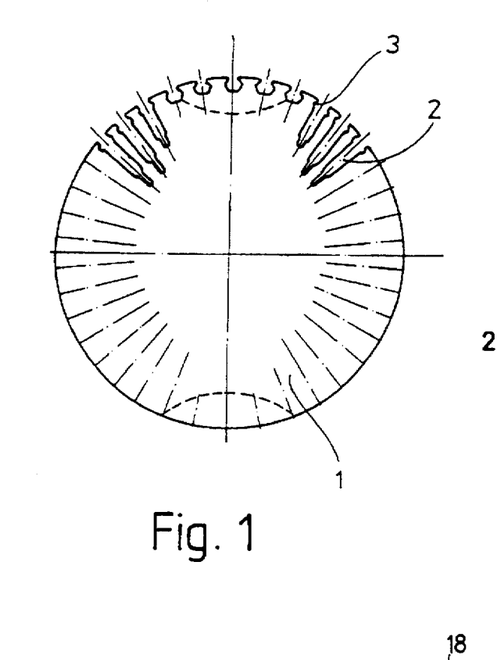
FIG. 1 is a highly schematic cross-sectional view of a rotor of a typical three-phase generator.

The highly schematic cross-sectional view of a rotor of FIG. 1 is representative of a forged steel rotor blank, cut to cylindrical shape, having a diameter of about 2 m. The overall length, not visible, including stub shafts, can be up to about 20 m, and even more. The rotor is used for a typical three-phase generator. The stub shafts are not shown, and the rotor blank is of any well known construction. The rotor is formed with circumferentially located, radially directed, essentially relatively parallel rotor grooves 2. The deep grooves 2 are provided for reception of field windings, and are made in accordance with the method of the present invention. The depth of these rotor grooves is between about 16–22 cm; their maximum width is between about 25–50 mm. The rotor grooves have essentially parallel flanks defining the groove. Their longitudinal cross section is stepped. The rotor grooves, as seen in the cross section in FIG. 1, are formed in the vicinity of the circumference of the rotor with generally triangular cover reception grooves 3, designed to receive strip-like cover elements, not shown, and as well known. These cover elements may be cover wedges. The cover grooves 3 are not made when the deep grooves 2 are formed; they are cut in a special manufacturing step, as well known, and will not be further considered in the explanation of the present invention.

Figure 2:
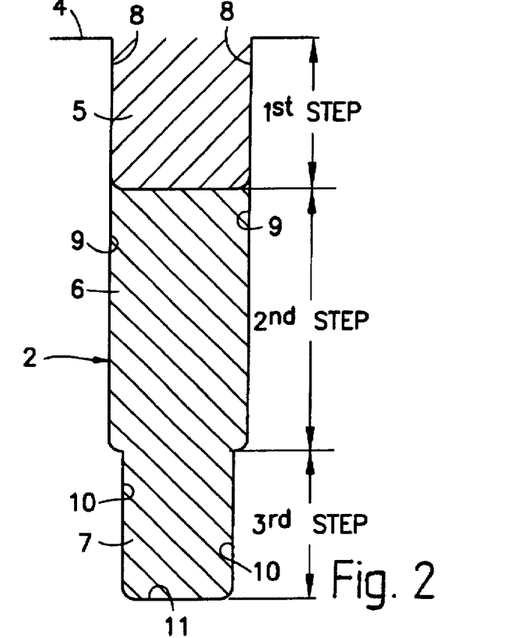
FIG. 2 is a cross-sectional view of the groove of the rotor of FIG. 1, to a highly enlarged scale.

As best seen in FIG. 2, the rotor grooves 2 have, starting from the circumference 4 of the rotor 1, a first groove portion or stage or step 5 of predetermined width. This step 5 then is continued further inwardly by a second groove portion or stage or step 6 of slightly narrower width. Radially inwardly, a third step or groove portion or stage 7 follows which is substantially narrower than the groove portion 6 and forms a cooling duct or cooling groove. The first and second steps 5, 6 for the groove are used to receive the sides of the field winding of the generator. Hence, these sides must be finished.

The first step 5 has a longitudinal extent or depth of about 6 cm; the second and third steps 6, 7, together, have a longitudinal extent or depth of about 16 cm, to form an overall depth of the groove of about 22 cm.

In accordance with the present invention, the various steps of the rotor groove 2 are made by disk or rotary mill cutters in two sequential cuts, in which the first step 5 is cut in a first cutting operation which, essentially simultaneously cuts radially into the material to form the groove, and also provides a fine finish at the respectively positioned side walls 8 of the groove. In a second cut, subsequent to the first cut of the so finished first step, another cutter then forms, in one operation, the second and third steps 6, 7. The other cutter is a single second disk or rotary mill which, again essentially simultaneously, cuts the entire groove and finish radially cuts the side walls 9, 10, respectively, of the groove. The bottom 11 of the third step 10 need not be finished, since it will not receive electrical windings, the third step operating as a cooling fluid duct.

Figure 3:
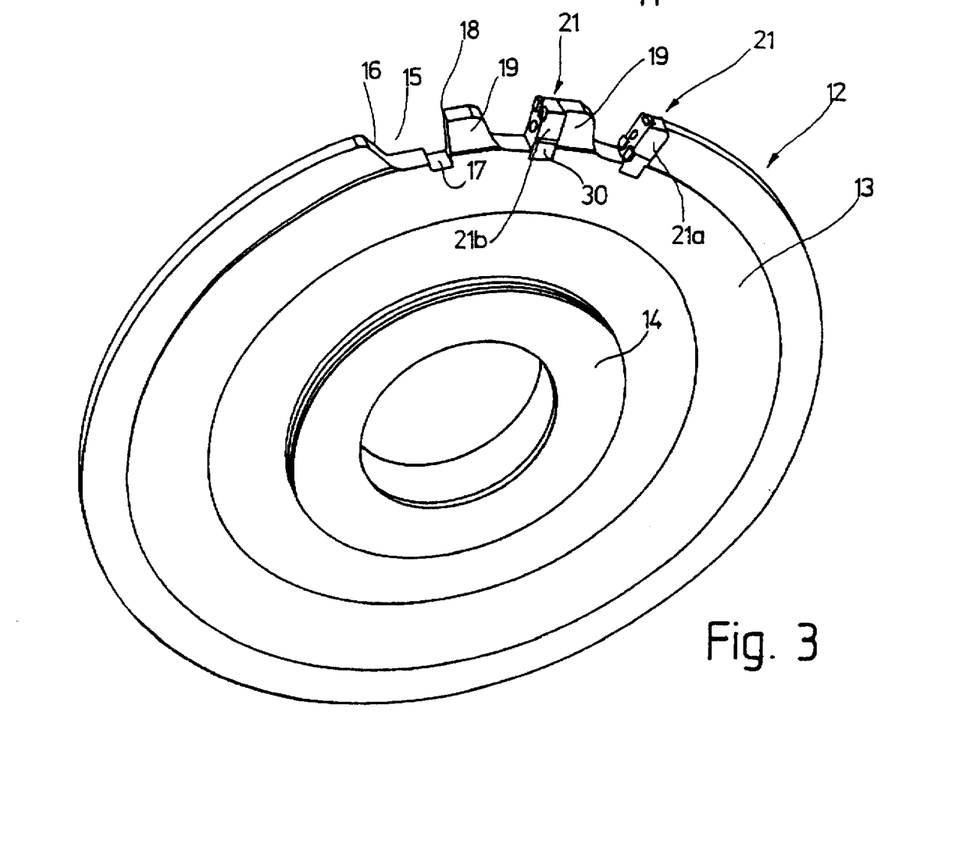
FIG. 3 is a perspective, partly schematic illustration of a disk milling tool to make the second and third steps of the rotor groove of FIG. 2.

The milling cutters to carry out this process are, in principle, essentially similar. FIG. 3 illustrates the milling cutter 12 to make the second and third step 6, 7 in a highly schematic, perspective view. The milling cutter 12 has a diameter between about 80 and 110 cm. The tool body 13 is essentially disk-like, and has a hub 14. The circumference of the tool body 13 is formed with cut-off workpiece chip reception recesses 15. Only three such recesses are shown in FIG. 3 for simplicity. The recesses 15 are formed with an inclined surface 16.

Figure 4:
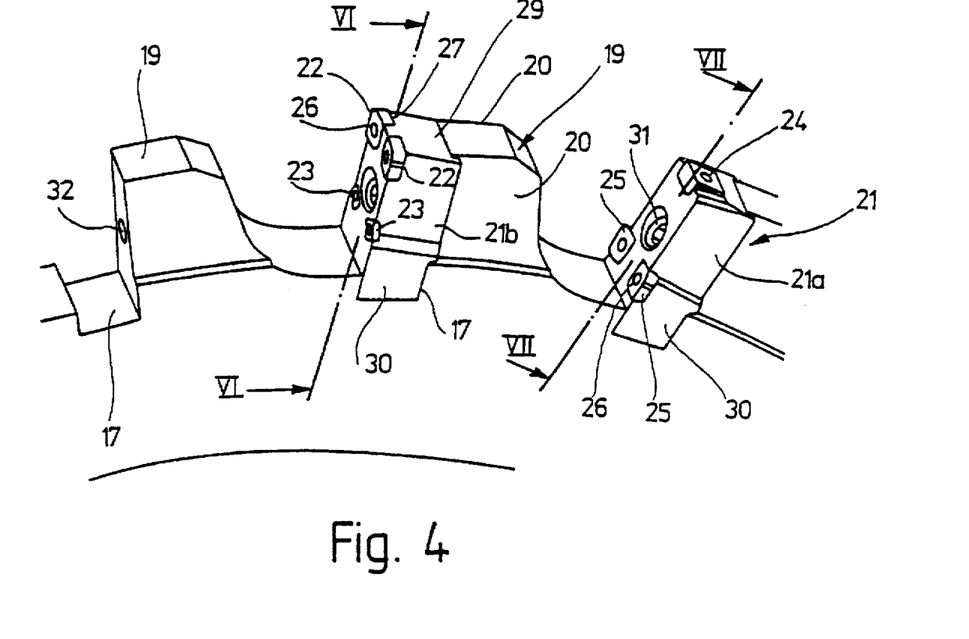
FIG. 4 is a highly enlarged fractional perspective view of the milling tool of FIG. 3, illustrating two sequential cartridges with indexable cutter chips thereon in different arrangements.
Figure 5:
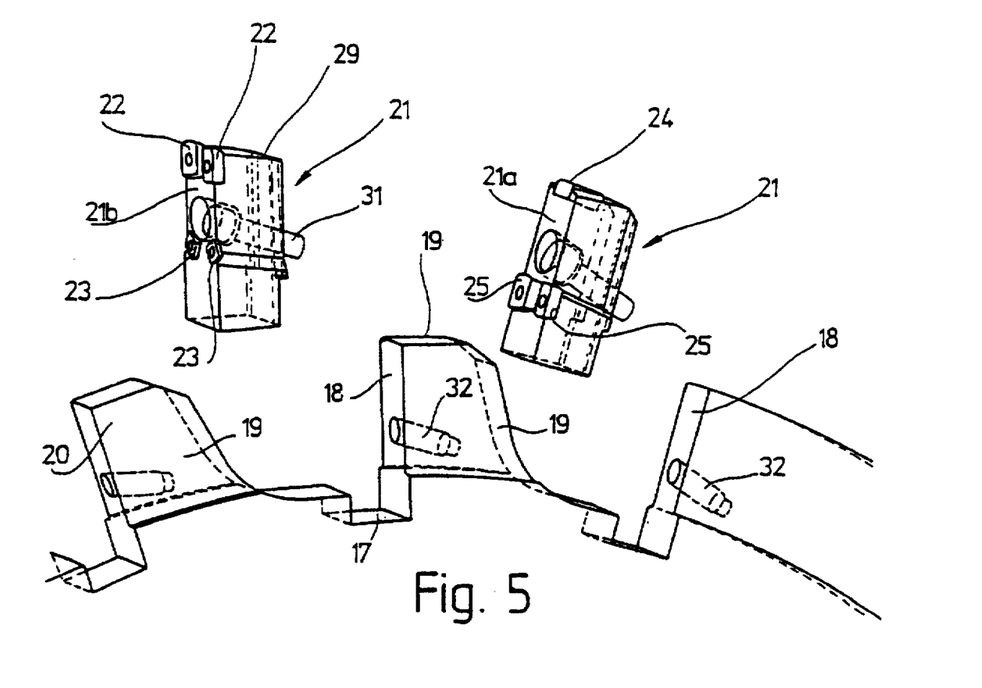
FIG. 5 is a view similar to FIG. 4, in which the cartridges are removed, in partly exploded view.

In accordance with a feature of the invention, the bottom of the recesses 15 is formed with a transversely extending groove 17 which, in cross section, is roughly rectangular. One side wall of the groove, radially outwardly, terminates in an engagement surface 18 of a rib-like or tooth-like extension 19 of the tool body 13. The extension 19 may also be referred to as a tooth of the tool body 13. Each of the teeth 19 is located between two adjacent workpiece chip removal recesses 15 and, as best seen in FIGS. 4 and 5, is delimited by two parallel side walls 20. The spacing of the side walls 20 is so selected that the tooth 19, in axial direction of the tool, has a narrower width than the width of the tool body 13 adjacent the essentially rectangular groove 17. Each one of the teeth 19, which are axially symmetrically located with respect to the remainder of the tool body 13, forms a guide rib for an essentially parallelepiped-shaped cartridge 21. The cartridges 21 are supplied with indexable cutter chips or bits 22, 23 and 24, 25, respectively. The cutter chips 22–25 are received in suitable seats formed in the cartridges for precisely positioned and aligned retention. One of the seats is shown at 27 for a cutter chip 22 in FIG. 4. The chips are secured to the respective cartridge 21 by suitable attachment screws 26.

Each one of the cartridges 25 is formed with a groove 29 (FIG. 5) extending at least as long as the radial height of a respective tooth 19. The grooves 29 are formed on the sides of the cartridges 21 opposite the side where the cutter chips 22, 23, 25, respectively, are located, and are continuous. The grooves are symmetrical with respect to the cartridge 21 and have parallel flanks. As best seen in FIGS. 4 and 5, each cartridge with its groove 29 is secured to one of the teeth 19. The lower portion 30 of the cartridge is axially widened, to be in alignment with the adjacent portion of the tool body 13. The cartridges fit into the groove 17, with close tolerance. The cartridges 21, when so inserted on the teeth 19 of the tool body 13, and engaged in the groove 17, are then secured by a cylinder head screw or bolt 31, screwed in an associated tapped bore 32 in the associated tooth 19. The axis of the tapped bore 13 is essentially tangential to the circumference of the circular cylindrical body 13. It is not precisely tangential, however, but, as best seen in FIG. 5, is slightly tipped radially inwardly with respect to a circumferential direction. Thus, when the headed screw 31 is tightened, the cartridge 21 is pressed against the attachment surface 18 on the tooth 19 in one direction and, further, is radially inwardly pressed into the groove 17, so that the cartridge will fit tightly against the respective engagement surfaces. Each cartridge 21, thus, is held in interlocking relation, axially as well as radially, and supported on the tool body 13; the groove-like recess 17 reliably excludes tipping of the cartridge 21.

The recesses 15 to accept the cut chips of workpiece material are larger than in conventional rotary milling cutters. The width of the openings 15, at the circumference of the tool 13, measured in circumferential direction, corresponds roughly to the circumferential distance of a tooth 19 and a cartridge 21 secured thereto. The radial depth of the recesses 15 is somewhat deeper than the cutting depth of the third step 7 of the groove 2.

The tool rotates in the direction of the arrow shown in FIG. 4.

Figures 7, 8:
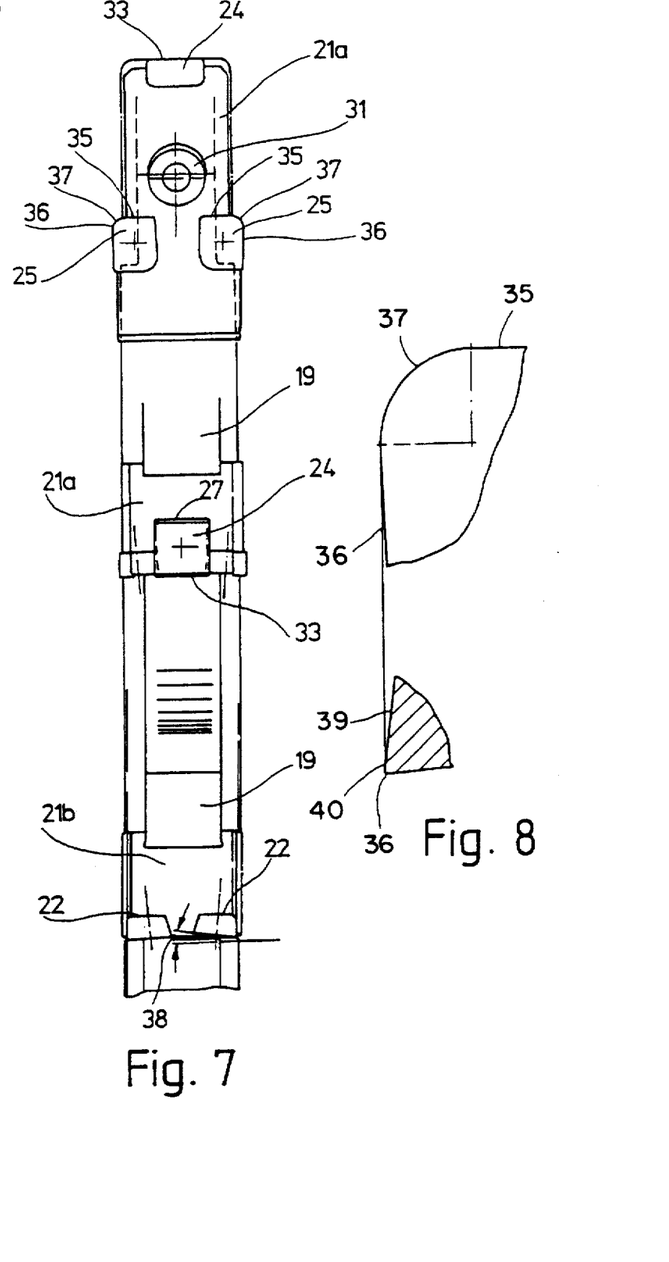
FIG. 7 is a radial top view, and forming an idealized general representation of a side view of a cartridge, in the direction of line VII—VII of FIG. 4, as well as of a preceding cartridge.
FIG. 8 is a fragmentary side view and projection showing details of an indexable cutter chip in an end position of the tool of FIG. 6.

In accordance with a feature of the invention, two sequential cartridges 21, forming a pair, are supplied with different cutter chip arrangements. Each one of these pairs of cassettes has a first cassette 21a which has an essentially quadratic cutter chip 24 (FIG. 7) located symmetrically to a central plane of the cartridge. This chip 24 is located in a tangential position, and has a main cutting edge 33 (FIG. 7). The chips 24 operate with negative cutting geometry and have essentially parallelepiped shape.

Figure 6:
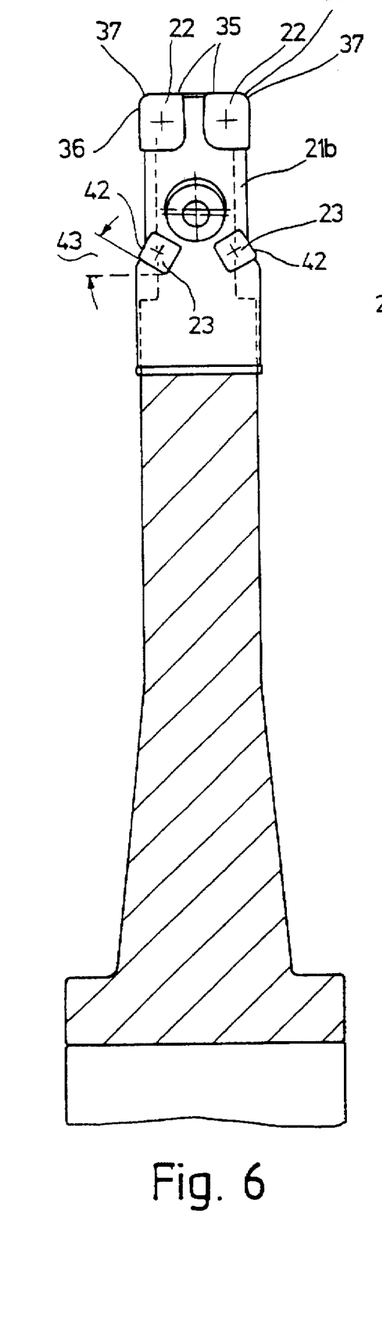
FIG. 6 is a side view and section of the tool of FIG. 4, cut along line VI—VI of FIG. 4.

The other cartridge, 21b, has two, in top view essentially rectangular cutter chips 22 secured thereon, located in the region of the circumference of the cartridge. The main edges 35 are circumferentially effective (see FIG. 6). The two indexable chips 22 are positioned in essentially radial arrangement and have, besides their end cutting edges 35, lateral or auxiliary side or finish cutting edges 36, which merge with the main cutting edge 35 over a curved portion 37 (see FIG. 8).

The chips 22 are of truncated pyramidal shape and operate with positive cutting geometry. They are retained in the respective cartridge at an axial position angle 38 deviating from 0°; a suitable deviation is between about 5° to 10°. Thus, the effective side or auxiliary or fine cutting edges 36 lead with respect to the inner non-acting side cutting edges.

The main cutting edge 33 of the central cutter chip 24 on cartridge 21a and the main cutting edges 35 of the side cutting chips 22 on cartridge 21b overlap. Together they provide a coarse cutting edge which is continuous; the lateral or auxiliary cutting edges 36 provide a continuous fine or finish cutting edge. Consequently, the tool, when used to make the third step 7, will form the side walls 10 with a finished or smoothly cut surface.

The tool can operate smoothly and with good running characteristics, ensuring high quality of surfaces on the side walls 10 of the grooves 2 (FIG. 2), since the end positioned cutter chips 22 are formed with a 0° or quieting chamfer 40 in the region of the their free surface 39. The chamfer angle is 0° immediately adjacent the edge 36, but then, in the next adjacent region, may form a clearance or relief angle in the order of between about 2° and 5°.

The cartridge 21b is fitted with indexable cutter chips 23, radially symmetrically spaced from a central plane of the cartridge. The chips 23 are essentially square and have axially outwardly positioned main cutting edges 42 (FIG. 6) which project axially beyond the cutting edges 36 of the end positioned cutter chips 22. They cut an inclined step at the transition between the second stage 6 of the groove 2 and the third stage 7, which, as best seen in FIG. 2, is preferably curved or inclined. The two cutter chips 23 are positioned at an angle 43 of about 30° in essentially radially adjusted location, such that the outwardly positioned effective cutting edges are radially offset with respect to the circumference and with respect to the ineffective cutting edges which are inwardly positioned.

The indexable cutting chips 23 forming the transition within the cartridge 21b corresponds to the two rectangular cutting chips 25 and cartridge 21a. The chips 25 are constructed similarly to the chips 22 and have a main cutting edge 35 and a lateral or auxiliary cutting edge 36, merging with the cutting edge 35 over a rounded region 37. The cutting edges 35 and the effective lateral or auxiliary cutting edges 36 make the coarse cut as well as the fine or finish cut of the side walls 9 of the second stage 6 of the rotor groove 2 (see FIG. 2). The relief surface 39 and the quieting surface 40 are similar to the surfaces described above in connection with FIG. 8.

The cutter chips 24, 22 and 23, 25 are located centrally or in pairs symmetrically with respect to a central plane of the tool body 13. Consequently, upon working on the raw blank, the forces acting will be axially balanced, so that the tool will run smoothly and quietly, cutting a groove with high surface qualities and accuracy of dimensions for the side walls 9, 10 (FIG. 2).

The tool to make the first step 5 in the groove 2 is, again, a rotary milling cutter 43 (FIGS. 9, 10) which, basically, is similar to the milling cutter 12 of FIG. 3. Only those features which differ from the cutter described in connection with FIGS. 3 to 8 will therefore be discussed in detail.

The tool body 130 has a hub 140; the circumference of the tool body is formed with workpiece material cut chip recesses 150 which are delimited by an inclined, curved chip removal surface 160 and formed in the bottom with a groove-like recess 170. Teeth 190, which are narrower in axial direction, with respect to the tool, and formed with parallel flanks, carry cartridges 210 located, thus, between the adjacent recesses 150. The cartridges 210 are formed at their back side with a radially continuous groove 290, having parallel groove flanks, which receive the respectively associated tooth 190—see FIG. 11. The cartridges 210 fit at the bottom 300 in the groove-like recesses 170, for radially secure support, and reliably retained against tipping. In circumferential direction, they engage a support surface 180 of the respectively associated tooth 190. A cylinder head screw 310, basically similar to the arrangement in FIG. 5, secures the respective cartridge to the tool body 130.

The interengaging support of the cartridges 210 on the tool body 130 is thus similar to the support of the cartridges 21 on the tool body 13. Thus, both cutters 12, 43 may be formed with a similar or identical tool base body 13 or 130, and one such tool body may suffice if the time taken to exchange cartridges is not of importance.

Figure 11:
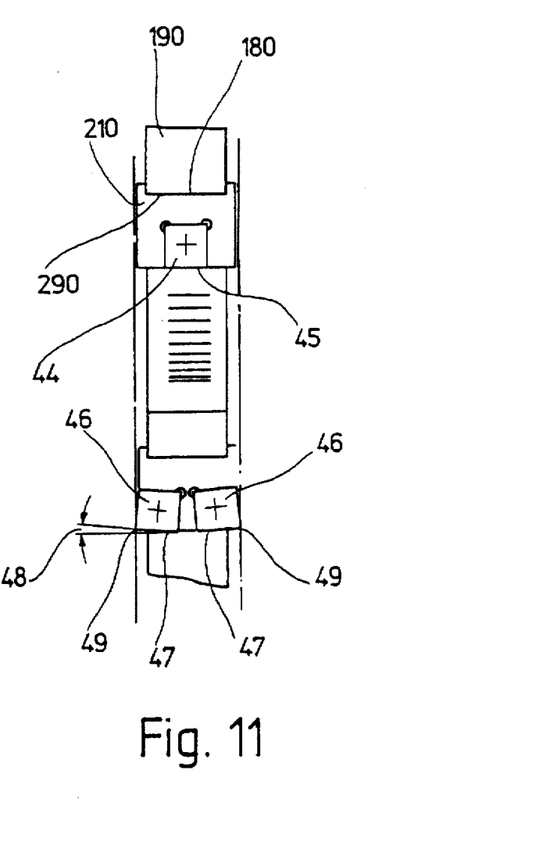
FIG. 11 is a developed top view illustrating two sequential cartridges.

The rotary milling cutter 43 has sequentially located cartridges 210 positioned on its circumference, in which sequential cartridges are fitted with different arrangements of indexable cutting chips. Cartridge tool 10a of each pair of cartridges has an indexable cutter chip 44 located at its circumference. It is essentially quadratic or square, tangentially arranged on the cartridge symmetrical with respect to a central plane of the tool body 130, and has an effective main cutting edge 45 (FIG. 11). The cutting edge 45—similar to the cutter chip 33 of FIG. 7—is shorter than the overall width of the cut. It operates with negative cutting geometry, see FIG. 9, with an axial adjustment angle, as in the cutter plate 24, of 0°.

The cartridge 210b of the pair of cartridges has two end cutting plates 46 located thereon which are positioned symmetrically with respect to the central plane of the tool body 130, located in tangential position. The effective cutting edges 47 overlap with the effective cutting edge 45 of the cutter plate 44 of the cartridge 210a. They have an operating angle 48 which differs from 0°, so that their axially outwardly positioned cutting edges trail, in direction of rotation of the tool, with respect to the inwardly positioned ineffective cutting edges.

Thus, the axially outwardly positioned auxiliary or finish cutting edges 49 of the indexable chips 46 are free to cut; the effective auxiliary cutting edges 49, together with the main cutting edges 47 and 45, form a combined coarse and finish cutting edge array, extending over the entire width of the cut, so that the first stage 5 of the groove, FIG. 2, can be precut or coarse cut and, essentially simultaneously, the side walls 8 of the groove are finished, or smooth, or finish cut.

Method of making grooves, and tool operation

Figure 9:
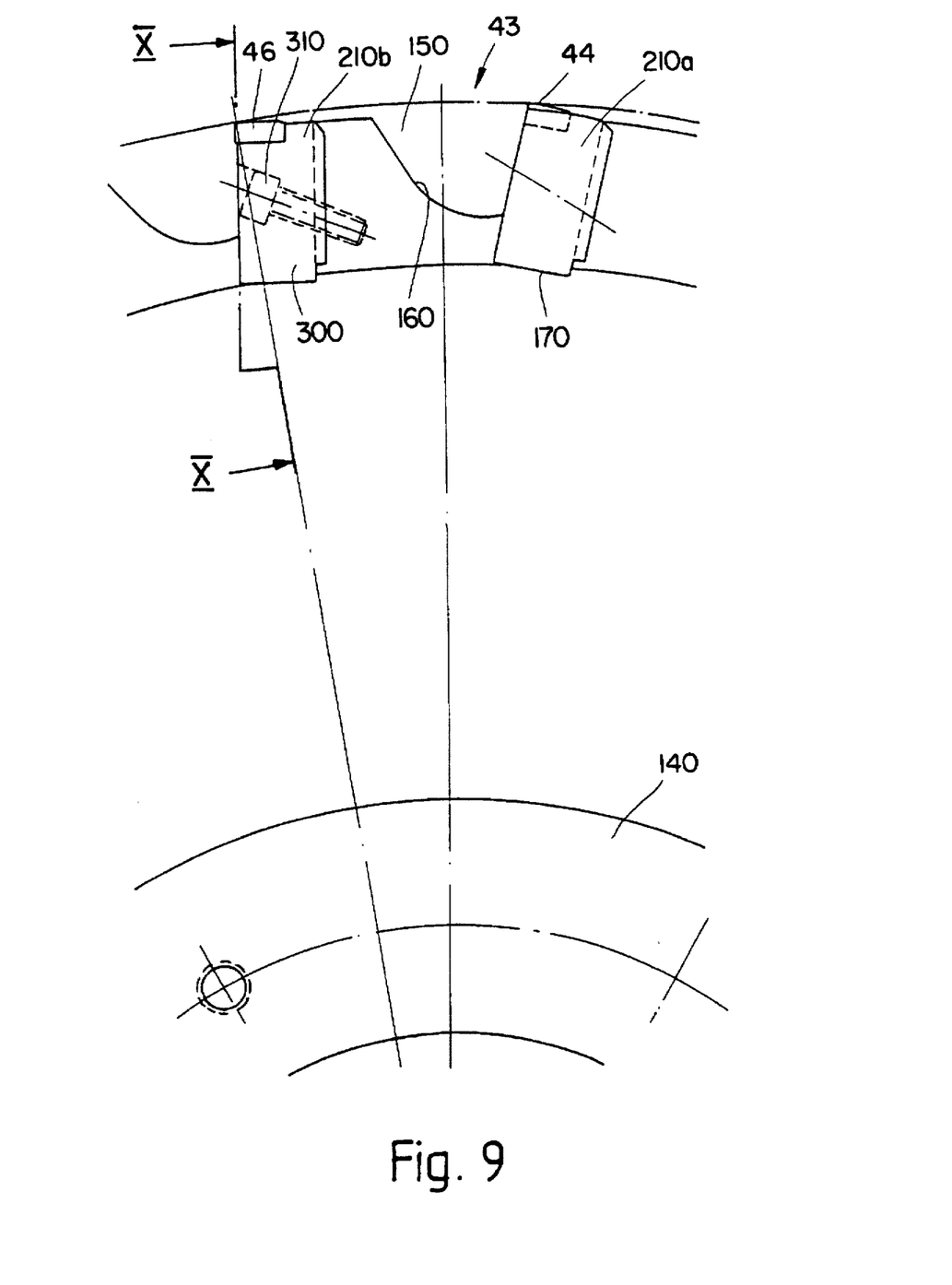
FIG. 9 is a fragmentary side View of a milling cutter illustrating details to make the first stage of the rotor groove shown in FIG. 1, and to yet another scale.
Figure 10:
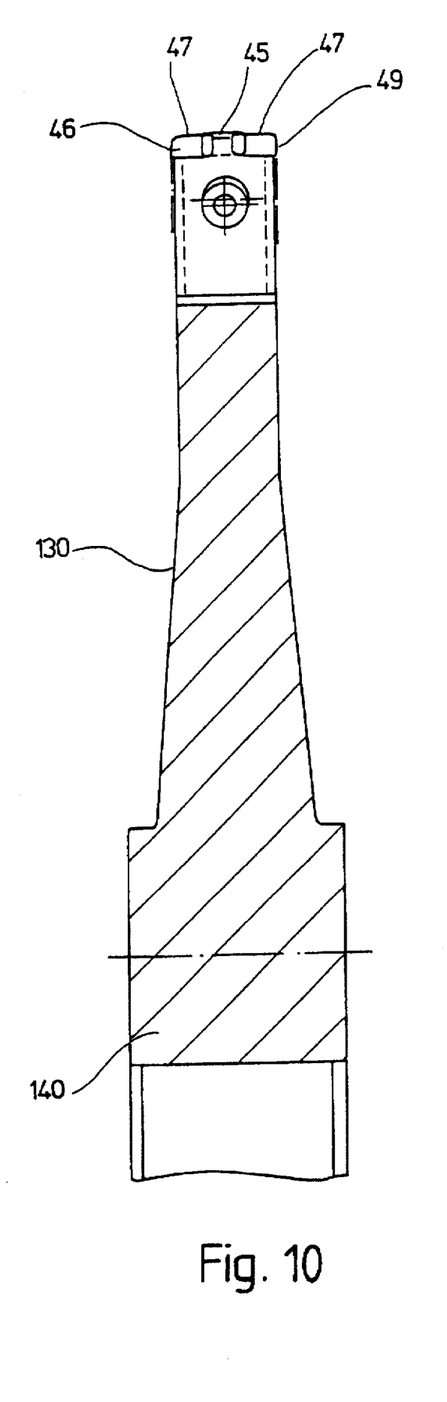
FIG. 10 is a part-sectional view along line X—X of FIG. 9.

To make the rotor grooves 2, the first step 5 is first cut in one operation by means of the tool 43 of FIGS. 9 to 11. Thus, in a single working step or operation, the coarse or machining operation into the material of the workpiece as well as the finish cutting operation for the side walls 8 of the groove are made. The depth of the first step 5 depends on the geometric design characteristics and, usually, is about one-third to one-quarter of the entire depth of the groove 2.

The milling cutters are then exchanged and the milling cutter 12 is used to make, in a single cutting operation, simultaneously the second and the third steps 6 and 7 of the groove 2. The indexable cutter chips 22, 23, 24 (FIGS. 6, 7) cut radially into the material of the workpiece to extend the length of the groove, in the coarse cut, extending over the entire width over the third stage 7 down to the bottom 11 of the groove 2. The lateral cutting edges 36 of the lateral cutting chips 22 finish the side walls 10 of the third stage 7.

In this operating step, the radially inwardly positioned cutter chips 25 carry out, with edges 35 the additional coarse cutting operation which, in the second step 2, is wider than the third step 7; the auxiliary cutting edges 36 of the chips 25 form the finish surface on the side walls 9 of the second stage 6. The cutter chips 25 also generate the transition surface between the third and second stages in the groove 2.

The enlarged workpiece chip removal recesses 15 are so dimensioned that they can receive the relatively large material chips which arise in these cutting operations. Due to the larger cutting radii, these chips will be longer than previously.

Each groove 2 of the rotor thus can be made in only two cuts, by using only two, essentially and basically similarly constructed rotary milling cutters, in which the side walls of the grooves are precisely dimensioned and have smoothly finished surface characteristics.

We claim:

1. A method to make deep grooves (2) in a metallic workpiece (1) optionally retention grooves in rotors for generators or turbines, comprising the steps of making only two sequential milling cuts, wherein each milling cut, utilizing a single milling cutter, carries out at the same time cutting of the groove into the metallic workpiece (1) having a desired final width and shape by simultaneously (a) a coarse cutting into the material in the direction of the depth of the groove to make a portion (5; 6, 7) of the groove of said desired width and shape, and (b) fine cutting the side walls (8; 9, 10) of the resulting portion of the groove by utilizing, in each of said two steps, a single milling cutter having both coarse cutting edges positioned for cutting into the material in the direction of the depth of the groove, and fine or finish cutting edges, positioned for finish cutting said walls of the groove; and wherein, in the direction of the depth of the groove, the portion (5) of said groove made in a first one of said two milling cuts adjoins the portion of said groove made by a second, sequential one of said two milling cuts.

2. The method of claim 1, wherein the groove (2) is a stepped groove having a first or outer groove portion (5) and a second or inner groove portion (6, 7) adjoining said first or outer groove portion and which is narrower than said first or outer groove portion; and wherein the first or outer groove portion (5) is cut into the workpiece by the first one of said two milling cuts, and the second or inner groove portion (6, 7) is subsequently cut in the second of said only two sequential milling cuts.

3. The method of claim, wherein, in each cut, the desired width of the groove is cut by at least two sequentially operating cutter chips, each cutter chip cutting a portion of the width of the groove; and wherein said fine cutting step is made by some of said cutter chips, which include laterally projecting cutting surfaces, smoothing and finish cutting the side walls (8; 9, 10) of the groove.

4. A milling cutter to make a deep groove in a metallic workpiece, optionally a retention groove in a rotor for generators or turbines, comprising an essentially disk-like rotary milling tool body (13, 130) formed with circumferential recesses (15, 150) for removal of cut workpiece material chips, cutter bit or chip cartridges (21, 210) located in said recesses and secured to the tool body, said cartridges being formed with cutter bit or chip seats (27); and cutter bits or chips (22, 23, 25; 44, 46) retained on and fitted against said bit or chip seats (27) in the cartridges, wherein some (22, 23, 25; 44, 46) of said cutter bits or chips, located in said cartridges, have at least one cutting edge forming a main or coarse cutting edge (33, 35, 42; 45, 47) exposed for end cutting at least a portion of the groove, and wherein at least a portion of said cutter bits or chips (22, 25; 46) located in said cartridges, have at least one fine or finish cutting edge (36, 49) exposed for cutting along the side walls of the groove;

wherein said cutter bits or chips with at least one main cutting edge cut, with respect to the width of the groove (2), a portion of said width, and sequential cartridges have said cutter chips with said at least one main cutting edge and said at least one fine cutting edge in different combinations located on the respective sequential cartridges; and wherein said cutter bits or chips having said fine or finish cutting edges in at least one of the sequential cartridges, have outwardly directed fine or finish cutting edges (36, 49) located adjacent the main cutting edges (33, 35, 42; 45, 47), whereby the combined operation of said cutting edges of the sequential cartridges (21a, 21b; 210a, 210b) with the main or coarse cutting edges of the cutter bits or chips, and the fine or finish cutting edges on the respective cutter bits or chips will make a complete coarse and finish cut of the groove simultaneously.

5. The milling cutter of claim 4, including a groove-like recess (17, 170) formed in the chip removal recesses; and wherein the cartridges (21, 210) are shaped to fit with an interengaging connection within said groove-like recesses (17, 170) formed in the tool body (13, 130) for radial reception within said groove-like recess and radial support therein.

6. The milling cutter of claim 4, further including an attachment screw (31) connecting the respective cartridges (21, 210) to the tool body (13, 130), said attachment screw (31) extending in essentially tangential direction with respect to the tool body (13).

7. The milling cutter of claim 4, wherein the cartridges (21, 210) and the tool body (13, 130) are formed with respectively located projection-and-recess means (19–29; 190–290) axially, interengagingly, retaining the cartridges on the tool body (13).

8. The milling cutter of claim 7, wherein said projection-and-recess means comprise a groove (29, 290) formed in the respective cartridges (21, 210) and a projecting rib or tooth (19, 190) formed on the tool body (13, 130) and fitting into the groove of the cartridge.

9. The milling cutter of claim 4, wherein sequentially positioned cartridges (21a, 21b; 210a, 210b), forming a pair, and located on the tool body (13, 130) have said cutter chips arranged in this manner:

one (21a, 210a) of the cartridges has, at least one of said cutter chips located centrally (24, 44), with respect to a center line of the groove to be cut; and the other cartridge (21b, 210b) has two of said cutter chips axially symmetrically located as a pair (22, 23, 25, 46) located, at respective lateral sides of the associated cartridge aligned with, or overlapping the edges of the centrally located chip or chips on said one cartridge (21a, 210a), whereby the cutter chips on the sequential cartridges will cut the entire width of the groove.

10. The milling cutter of claim 9, wherein the at least one centrally located chip (24, 44) is located, with respect to the circumference of the tool body (13, 130), in the respective cartridge in essentially tangentially aligned position.

11. The milling cutter of claim 10, wherein the cutter chips (46) of the sequential cartridge (21b) are located in the sequential cartridge in a position essentially tangential to the tool body (130), and carrying said fine or finish cutting edges (49) at their axially outwardly located sides.

12. The milling cutter of claim 9, wherein said cutter chips (46) in the sequential cartridge (21b, 210b) have an axial adjustment angle of greater than 0°.

13. The milling cutter of claim 10, wherein those cutter chips (22) forming the pair of laterally positioned cutter chips are located in essentially radial position with respect to the tool body (13).

14. The milling cutter of claim 9, wherein at least one of the sequentially positioned cartridges (21a, 21b) carries an additional pair of axially symmetrically located cutter chips (23; 25) located in radial spacing from the main or coarse cutting edge or edges (33, 35) of the cutting chip or cutting chips carrying said main or coarse cutting edge or edges.

15. The milling cutter of claim 14, wherein the additional pair of cutter chips (23) has its main cutting edges (42) located in an angular position greater than 90°, and optionally about 30°, to generate two laterally spaced chamfered corners in a stepped groove.

16. The milling cutter of claim 14, wherein the additional pair of laterally placed cutter chips (25) is formed with laterally arranged fine or finish cutting edges (36) and located in the respective cartridges in essentially radial position, with respect to the tool body (13, 130).

17. The milling cutter of claim 4, wherein those cutter chips (22, 25) file or finish cutting the side walls (9, 10) of the groove (2) have a rounded corner (37) joining the fine or finish cutting edge (36) thereof with the main or coarse cutting edge (35) thereon.

18. The milling cutter of claim 17, wherein those cutter chips (22, 25) having the at least one fine or finish cutting edge (36) are formed with a relief (39) adjacent the fine or finish cutting edge (36) and a quieting or running region having a relief angle of between 0° and an angle which is less than the relief angle extending beyond said corner region.

19. The milling cutter of claim 4, wherein said cutter bits or chips having said fine or finish cutting edges in at least one of said sequential cartridges have outwardly directed fine or finish cutting edges (36, 49) which are located immediately adjacent said main cutting edges (33, 35, 42; 45, 47).

* * * * *